United States Patent
Kim et al.

(10) Patent No.: US 7,175,766 B2
(45) Date of Patent: Feb. 13, 2007

(54) APPARATUS AND METHOD FOR PERFORMING TERTIARY TREATMENT OF SEWAGE BASED ON POROUS FILTERING MEDIA

(75) Inventors: Young-Sug Kim, Gyeonggi-do (KR); Moon-Hyoung Lee, Seoul (KR); Hong-Kyu Jang, Seoul (KR); Chung-Hee Chang, Gyeonggi-do (KR); Chai-Sung Gee, Gyeonggi-do (KR)

(73) Assignee: Korea Institute of Construction Technology, Gyeonggi-Do (KR)

( * ) Notice: Subject to any disclaimer, the term of this patent is extended or adjusted under 35 U.S.C. 154(b) by 0 days.

(21) Appl. No.: 10/537,050

(22) PCT Filed: Dec. 2, 2002

(86) PCT No.: PCT/KR02/02268

§ 371 (c)(1),
(2), (4) Date: Apr. 19, 2006

(87) PCT Pub. No.: WO2004/050564

PCT Pub. Date: Jun. 17, 2006

(65) Prior Publication Data

US 2006/0231489 A1    Oct. 19, 2006

(51) Int. Cl.
*C02F 3/00* (2006.01)

(52) U.S. Cl. ............ 210/616; 210/748; 210/758; 210/532.1; 210/151; 210/189; 210/220

(58) Field of Classification Search ......... 210/151, 210/189, 615–616, 220, 758, 760, 748, 532.1
See application file for complete search history.

(56) References Cited

U.S. PATENT DOCUMENTS

| 5,387,335 | A | 2/1995 | Iwai et al. | |
|---|---|---|---|---|
| 6,682,653 | B2 * | 1/2004 | Chuang et al. | 210/616 |

FOREIGN PATENT DOCUMENTS

| EP | 0882676 A1 | 12/1998 |
|---|---|---|
| JP | 62-083093 | 4/1987 |
| WO | WO 8602630 | 5/1986 |

* cited by examiner

*Primary Examiner*—Chester T. Barry
(74) *Attorney, Agent, or Firm*—Miles & Stockbridge PC; James T. Carmichael (57) ABSTRACT

Provided is an apparatus and method for performing tertiary treatment of sewage based on porous filtering media. The apparatus for performing tertiary treatment of sewage based on porous filtering media includes a reaction tank for receiving effluent wastewater from a primary settling tank; and porous filtering media, which is located in the reaction tank and has a predetermined size of surface area and opening, for settling suspension in the effluent wastewater and removing organic matter and nutritive salts included in the suspension.

27 Claims, 5 Drawing Sheets

APPARATUS AND METHOD FOR PERFORMING TERTIARY TREATMENT OF SEWAGE BASED ON POROUS FILTERING MEDIA

TECHNICAL FIELD

The present invention relates to an apparatus and method for performing a tertiary treatment of sewage by using porous filtering media to purify effluent wastewater from a settling basin of a sewage disposal plant and apply the water to wastewater reclamation and reusing system; and, more particularly, to an apparatus and method for performing a tertiary treatment of sewage by using porous filtering media, which can remove suspended solids, organic matters and nutritive salts included in the effluent wastewater from a secondary settling basin of a sewage disposal plant simultaneously by filling a settling and filtering basin with porous filtering media having large surface area and opening.

BACKGROUND ART

Generally, sewage includes such pollutants as solids, organic matters, nitrogen and phosphorous. Sewage purification is processed in three steps based on the method of treatment: a primary treatment, a secondary treatment and a tertiary treatment. In the primary treatment, suspended solids that can be precipitated easily are removed physically. In the secondary treatment, which is a main sewage treatment step, dissolved organic matters and organic solids are removed. In this step, biological methods are used usually. In the tertiary treatment, organic matters and nutritive salts that have not removed in the secondary treatment are removed by using physical, chemical and biological treatment methods.

In the biological secondary treatment, one of the most popular methods is an activated sludge method, which aims for an organic removal efficiency of 90% in average. However, since the biological secondary treatment normally operating has a limitation in removing the pollutants of the wastewater, the tertiary treatment needs to be performed to produce water of a good quality.

In the tertiary sewage treatment, following methods are used based on the sorts of materials to be removed. If organic matters including suspended solids should be removed from sewage, such methods as rapid sand filtering, coagulating precipitation and membrane separation are used. If nitrogen of nutritive salts is to be removed, a biological method of nitrification and denitrification is used. If phosphorous should be removed, coagulating precipitation and other biological methods, a biological nitrogen and phosphorous removal method, and their modifications are widely used.

If rapid filtering method is used, the quality of the purified wastewater is relatively fine. However, this method has a problem in maintaining the sewage treatment facility. For example, backwashing should be frequently performed. In case of membrane separation method, it is not appropriate for large-size sewage disposal facilities, because it costs a great deal of money to construct and maintain the facilities. Besides, it requires an additional reaction tank and high technology to remove phosphorous and nitrogen and maintain the sewage treatment facility.

DISCLOSURE OF INVENTION

It is, therefore, an object of the present invention to provide an apparatus and method for performing a tertiary treatment on sewage by using porous filtering media, the apparatus and method being capable of removing nitrogen and phosphorous in the effluent wastewater from a settling basin, as well as suspended solids and organic matters, by filling a settling and filtering basin with porous filtering media having large surface area and openings to maximize effective surface area, and supplying oxygen and ozone thereto additionally.

It is another object of the present invention to provide an apparatus and method for performing a tertiary treatment on sewage by using porous filtering media, which can remove organic matters and nutritive salts included in the effluent wastewater of the settling basin simultaneously in order to apply the purified effluent water to a wastewater reclamation and reusing system for various usages by optimizing physical, chemical and biological reactions.

It is another object of the present invention to provide an apparatus and method for performing a tertiary treatment on sewage by using porous filtering media, which can meet the quality goal of the effluent water from the tertiary treatment stably at low facility construction and maintenance costs with simple sewage treatment process.

In accordance with one aspect of the present invention, there is provided an apparatus for performing a tertiary treatment of sewage using porous filtering media, comprising: a reaction tank into which effluent wastewater of a settling basin flows; porous filtering media having predetermined sizes of surface areas and openings and filled in the reaction tank, for removing suspended solids by precipitating suspended solid particles included in the effluent wastewater and removing organic matters and nutritive salts included in the suspended solid particles along with the precipitation removal of the suspended solid particles.

In accordance with one aspect of the present invention, there is provided a sewage tertiary treatment apparatus, wherein the reaction tank includes: a fore reaction tank, which is filled with the porous filtering media, for collecting the effluent wastewater from the settling basin and performing precipitation based on biological, physical and chemical reactions; a rear reaction tank filled with a predetermined size of porous filtering media, for re-treating the effluent water from the fore reaction tank; a discharging tank provided with an overflow weir on one side of the upper part of the efflux portion, for retaining and discharging the secondary effluent water from the rear reaction tank; and rectifying walls having a plurality of efflux openings for partitioning the fore reaction tank, rear reaction tank and discharging tank.

The technology of the present invention can remove the organic matters and nutritive salts included in the effluent wastewater from a settling basin by using porous filtering media and optimizing physical, chemical and biological reactions. In the physical aspect, the technology of the present invention increases the efficiency of precipitating the suspended solid particles by maximizing the effective surface area of the porous filtering media filled in the reaction tank. Along with the precipitating removal of the suspended solids, the organic matters and nutritive salts included in the suspended solids are removed.

In the biological aspect, the technology of the present invention forms a high-density microorganism membrane on the surface of the porous filtering media filled in the reaction tank and increases the processing efficiency of the low-density organic matters included in the effluent wastewater from the settling basin. Also, if the microorganism membrane method (fixed growth) is used, the surplus organic matters that cannot be removed in the suspended microorganism method (suspended growth) can be removed easily.

In addition, in the present invention, chemical method is used additionally. In other words, a coagulant or an apparatus for injecting highly pure oxygen or ozone is added to promote the physical and biological processing efficiency. Here, if a coagulant is used, the precipitation efficiency of suspended solids is improved, and if ozone or highly pure oxygen is injected, the oxygen transmission rate is increased, and thus the biological action can be enhanced remarkably.

In accordance with one aspect of the present invention, there is provided a method for performing a tertiary treatment of sewage using porous filtering media, comprising the steps of: a) collecting the effluent wastewater from a settling basin, flowing the effluent wastewater through porous filtering media having predetermined sizes of surface areas and openings and filled in a fore reaction tank, and processing suspended solids and organic matters based on biological, physical and chemical reactions; b) taking in the rear reaction tank the effluent water cleaned in the fore reaction tank, flowing the cleaned water through the porous filtering media having predetermined sizes of surface areas and openings and filled in the rear reaction tank, and removing suspended solids and organic matters based on biological, physical and chemical reactions; and c) retaining the water discharged from the rear reaction tank in the discharging tank and discharging the water through an overflow weir.

Meanwhile, the sewage treatment method of the present invention further includes a step of inducing phosphorous removal and denitrification reactions by supplying a coagulant and highly pure oxygen or ozone to remove the phosphorous and nitrogen included in the effluent water simultaneously as well as suspended solids and organic matters.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Other objects and aspects of the invention will become apparent from the following description of the embodiments with reference to the accompanying drawings, which is set forth hereinafter.

Hereinafter, an embodiment of the present invention is described with reference to FIGS. 1 through 6. The sewage tertiary treatment apparatus and method using porous filtering media maximizes the effective surface area by filling porous filtering media having different pore sizes from each other porous filtering media to remove the organic matter and nutritive salts included in the effluent wastewater of a settling basin simultaneously by optimizing the physical, chemical and biological reactions, and remove nitrogen and phosphorous as well simultaneously by supplying oxygen and/or ozone the effluent wastewater from a settling basin. The technology of the present invention does not require any power source. It makes use of the principle of sedimentation by gravity, where materials fall down naturally as they flow.

Figure 1:
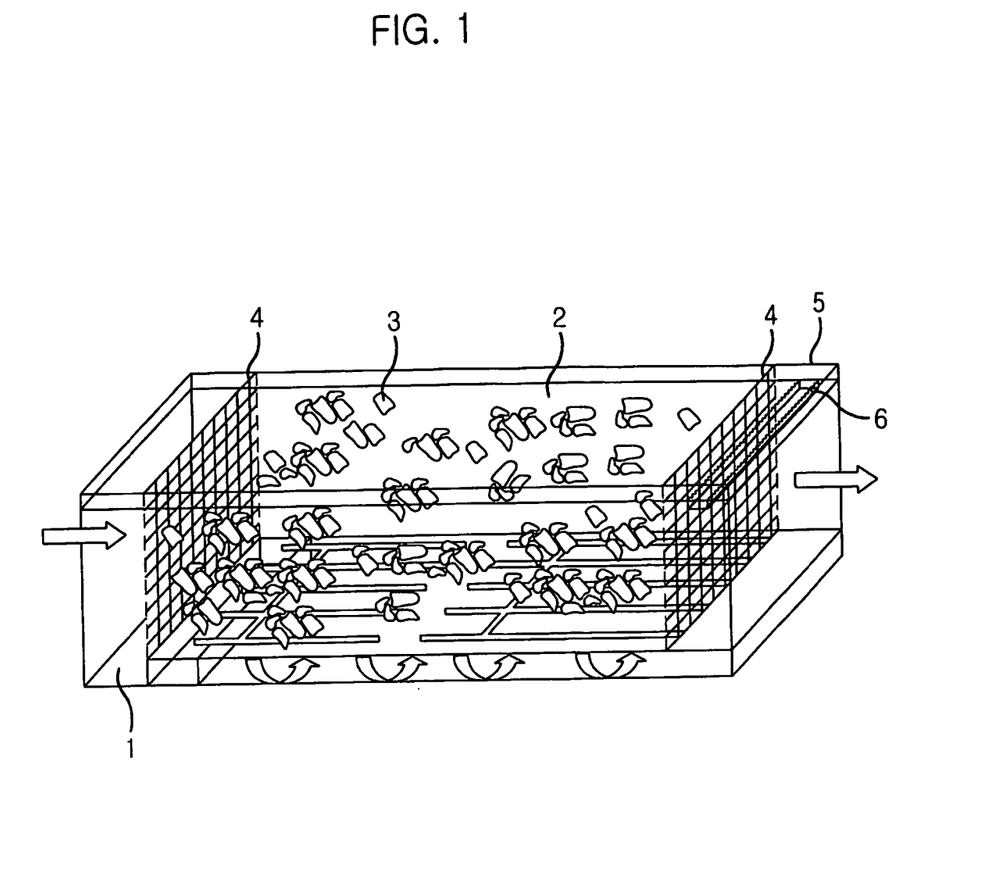
FIG. 1 is a perspective diagram illustrating a tertiary sewage treatment apparatus using porous filtering media in accordance with an embodiment of the present invention.

Referring to FIG. 1, in accordance with the embodiment of the present invention, the tertiary treatment apparatus includes: an inflow tank 1 for maintaining uniform flow of effluent wastewater from a settling basin; a reaction tank 2 formed in a predetermined size of a rectangle for retaining the effluent wastewater of the settling basin discharged from the inflow tank 1; porous filtering media having predetermined sizes of surface area and openings and filled in the reaction tank 2 for precipitating suspended solid particles included in the effluent wastewater and removing the organic matters and nutritive salts in the suspended solids, along with the precipitating removal of the suspended solid particles; a discharging tank 5 for discharging the effluent water from the reaction tank 2; porous rectification walls 4 for partitioning the inflow tank 1, reaction tank 2 and discharging tank 5, respectively; and an overflow weir formed in the upper surface of the discharging tank 5 for discharging the water purified in the discharging tank 5 uniformly.

Figure 2A:
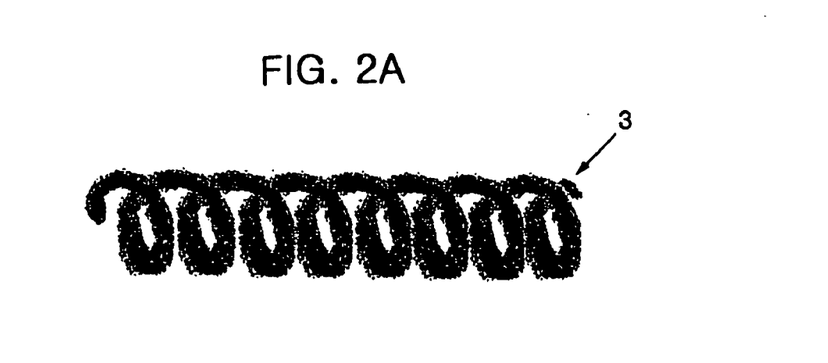
FIGS. 2A and 2B are diagrams describing porous filtering media, which is a major element of the present invention.
Figure 2B:
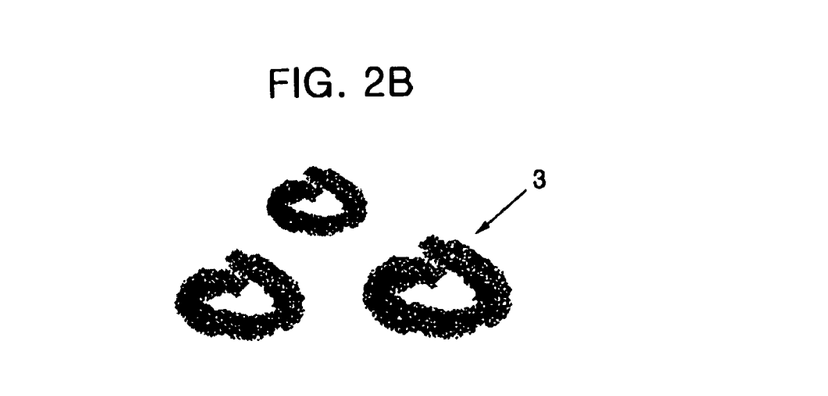

In the present embodiment, the porous filtering media 3 are formed of plastics or waste plastics. The porous filtering media 3 may be formed in the shape of coil spring, as illustrated in FIG. 2A, or in the shape of a ring with both ends going amiss, as shown in FIG. 2B.

Figure 2C:
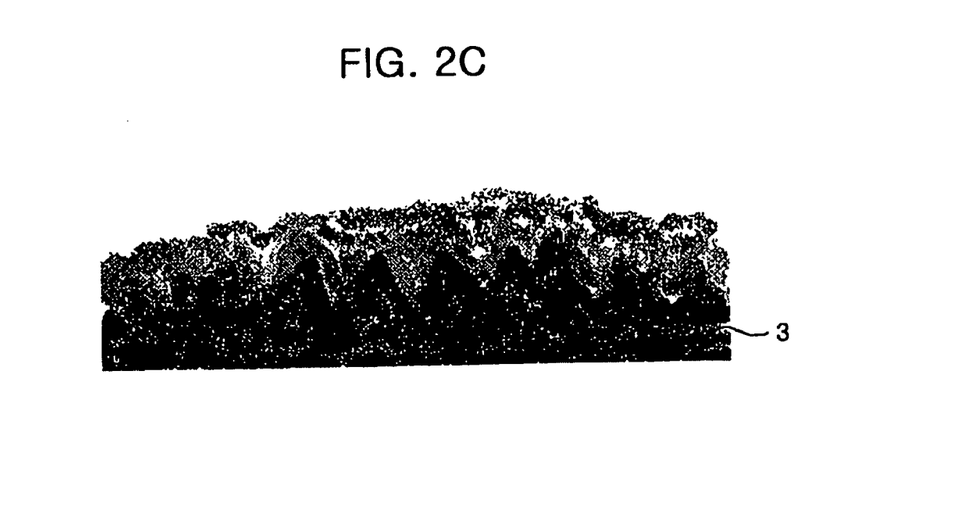
FIG. 2C is a diagram showing the porous filtering media, the surface of which is covered with precipitated sludge and on which a biological membrane is formed.

When the porous filtering media 3 of the above shapes are filled in the settling basin, sludge is precipitated on the surface of the porous filtering media 3 to form a biological membrane thereon, as described in FIG. 2C.

In addition, the size of the porous filtering media 3 filled in the reaction tank 2 is 10~300 mm and their opening rate is 50~90%. The porous filtering media 3 should maintain a large surface area with high opening rate. Desirably, the size of the filtering media is 10~300 mm. Since the present invention makes use of the principle of natural falling by gravity while flowing without any additional energy source from the outside, it is important to minimize the head loss of the reaction tank 2. Also, the size and opening rate of the filtering media are restricted to 10~300 mm and 50~90%, respectively, in order to remove the precipitated sludge between the openings of the porous filtering media 3.

In the embodiment of the present invention, the size of filtering media filled in the reaction tank 2 becomes bigger, as it goes from the upper part to the lower part of the reaction tank 2. This is to precipitate the sludge easily in the lower part of the reaction tank where the load of suspended solids is relatively high.

Figure 3:
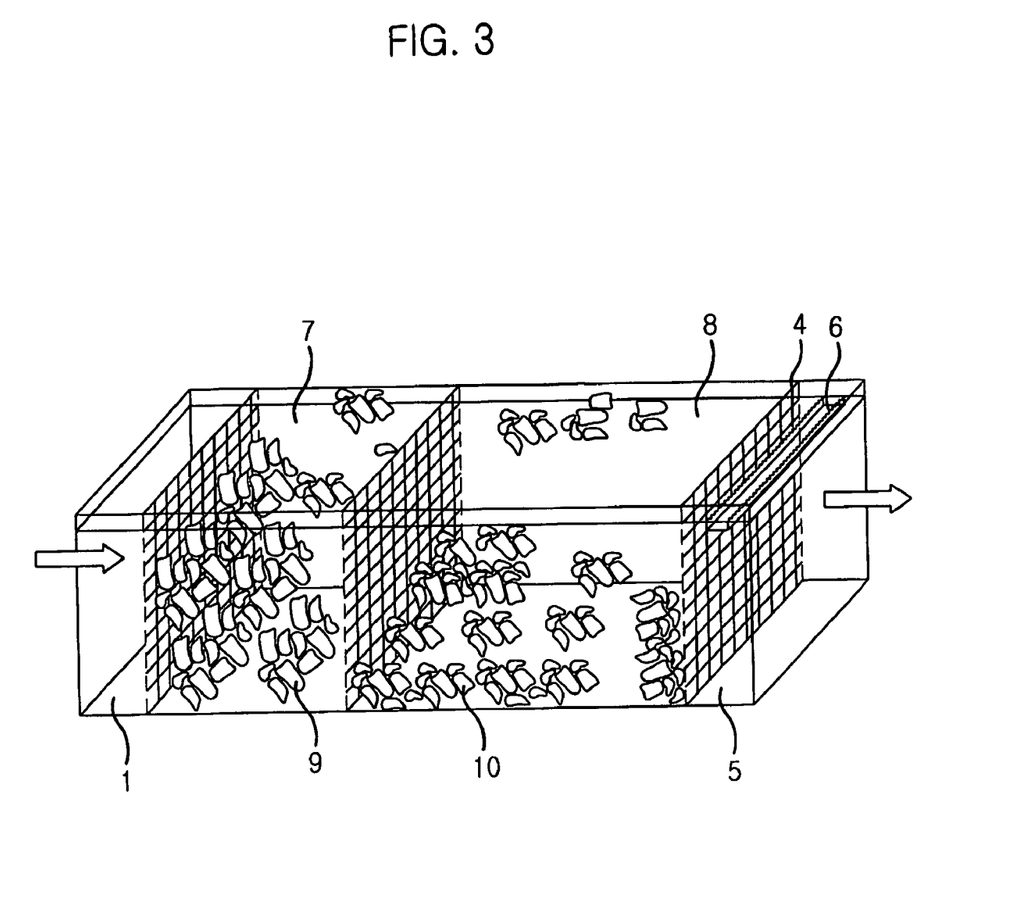
FIG. 3 is a perspective diagram describing a tertiary sewage treatment apparatus using porous filtering media in accordance with another embodiment of the present invention.

Referring to FIG. 3, another embodiment of the present invention is described. As illustrated in the drawing, the sewage tertiary treatment apparatus includes: an inflow tank 1 for collecting the effluent wastewater from the outside in a sewage disposal plant; a fore reaction tank 7, which is formed one side of the inflow tank 1 and filled with 50~300 mm of porous filtering media, for treating the effluent wastewater from the inflow tank 1 through biological, physical and chemical reactions; a rear reaction tank 8 filled with 10~200 mm of porous filtering media, for re-treating the effluent water from the fore reaction tank 7; a discharging tank 5 provided with an overflow weir 6 in the upper part, for retaining and discharging the effluent water from the rear reaction tank 8; and porous rectifying walls 4 having a plurality of efflux openings for partitioning the inflow tank 1, fore reaction tank 7, rear reaction tank 8 and discharging tank 5.

If the reaction tank is divided into a fore reaction tank 7 and a rear reaction tank 8, as illustrated in FIG. 3, the pollutant removal efficiency and the water transmission capacity of the reaction tank can be improved by differentiating the size of porous filtering media 9 and 10 filled in the fore and rear reaction tanks 7 and 8. That is, the concentration of the suspended solids coming into the fore reaction tank 7 is higher than that of the suspended solids coming into the rear reaction tank 7. Therefore, 50~300 mm of filtering media is supplied to the fore reaction tank 7, and to the rear reaction tank 8, 10~200 mm of filtering media is supplied.

In the present embodiment, the fore reaction tank 7 and the rear reaction tank 8 are formed of an overflowing precipitation and biological filtering basin, and the porous filtering media 9 and 10 are formed of plastics or waste plastics molded into predetermined shapes, that is, into a coil spring shape or a ring with both ends going amiss, as shown in FIGS. 2A and 2B.

In the present embodiment, sludge can be removed easily by filling the porous filtering media 9 or 10 of smaller size in the fore part of each reaction tank 7 and 8 and larger size, in the rear part, or the porous filtering media 10 or 9 of larger size in the fore part of each reaction tank 7 or 8 and smaller size, in the rear part. This way, the suspended solids could be precipitated more in the fore part of each reaction tank 7 and 8 and less in the rear part. Here, the opening rate of the porous filtering media 9 and 10 filled in the fore and rear reaction tanks 7 and 8 is 50~90%.

Besides, the sludge in the reaction tanks 7 and 8 can be removed easily by differentiating the size of the porous filtering media 9 and 10 according to the depth of the reaction tanks 7 and 8. In other words, by filling the porous filtering media 9 and 10 of smaller size in the upper part and those of larger size in the lower part of the reaction tanks 7 and 8 so that the sludge could be precipitated in the lower part of a reaction tank whose load of suspended solids is relatively higher than the other.

Figure 4:
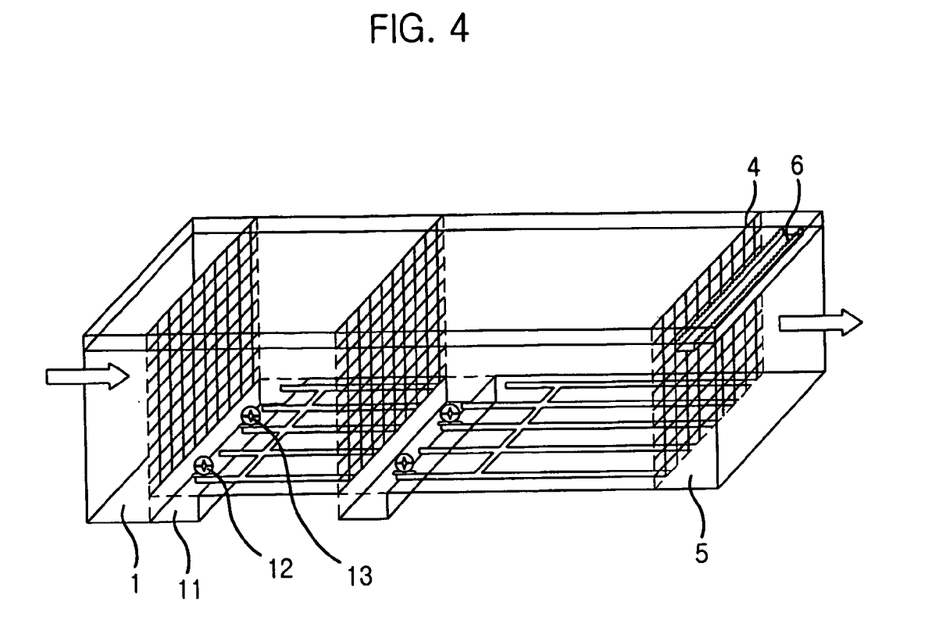
FIG. 4 is a perspective diagram showing a detailed structure of the tertiary sewage treatment apparatus using porous filtering media in accordance with the present invention.

This embodiment of the present invention further includes a sludge retention tank 11 at a predetermined position of the bottom surface of the fore and rear reaction tanks 7 and 8 to remove the sludge produced during the sewage treatment process effectively, as shown in FIG. 4; and an air supplier 12 and a supersonic generation unit 13 to remove the sludge stuck to the filtering media in the retention tank 11 effectively. In the present embodiment, suspended solids and microorganisms are precipitated on and attached to the surface of the porous filtering media 9 and 10 filled in the fore and rear reaction tanks 7 and 8, while the effluent water is processed. Then, as time passes, sludge overly precipitated and grown is slide down and slough off and accumulated in the lower part of the reaction tanks 7 and 8 according to the principle of gravity.

Figure 5:
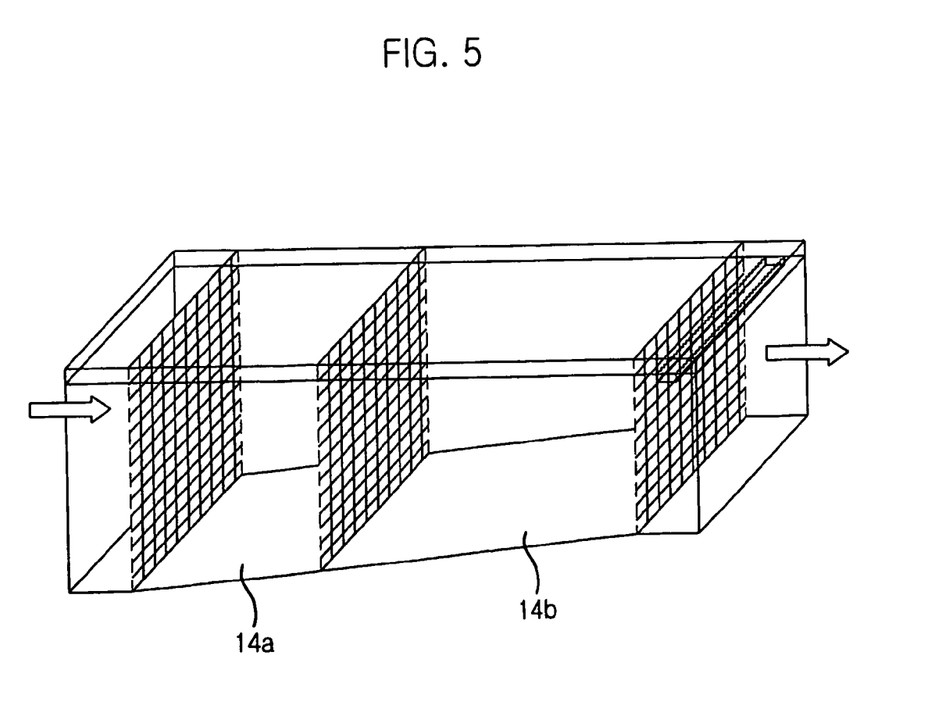
FIG. 5 is an exemplary diagram depicting a modified reaction tank, which is a major element of the present invention.

Referring to FIG. 5, the area 14a of the influx portion of the fore reaction tank 7 is formed larger than the area 14b of the efflux portion of the rear reaction tank 8 to make the current run at a uniform speed in the fore and rear reaction tanks 7 and 8. Considering the decrease in the cross-section area caused by the sludge precipitation in the fore reaction tank 7, the apparatus of the present embodiment is formed in a structure that can prevent unequal speed of the current. If sludge is precipitated in the fore reaction tank, the water transmission capacity can be deteriorated. However, the structure of the present embodiment makes it possible to maintain the facility smoothly and keep the processing efficiency continuously.

Figure 6A:
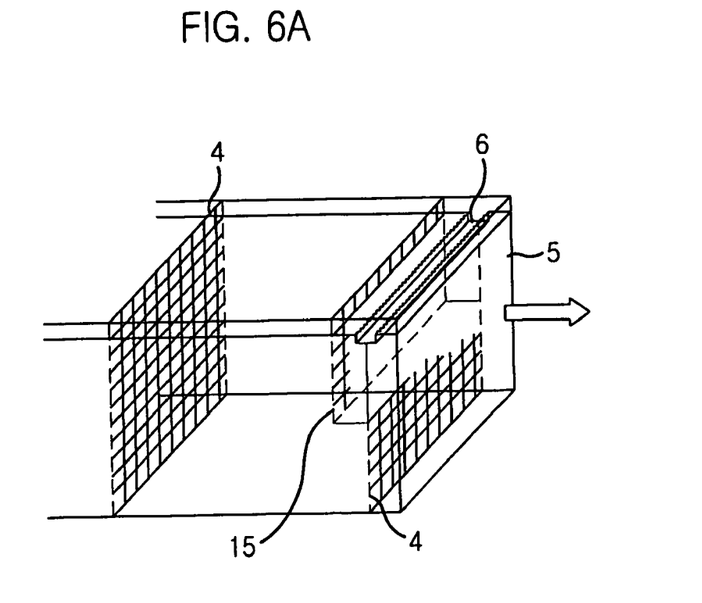
FIGS. 6A and 6B are perspective and cross-sectional diagrams illustrating a two-step discharging unit, which is another major element of the present invention.
Figure 6B:
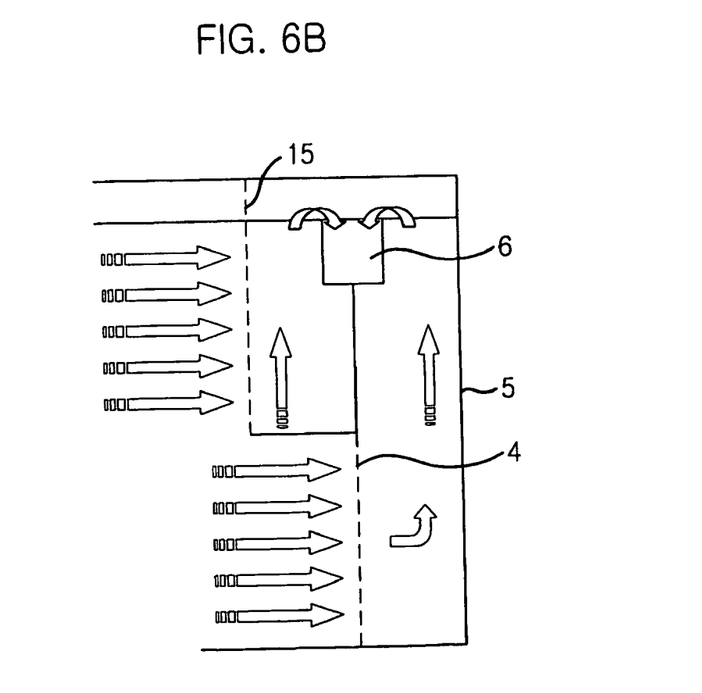

Referring to FIGS. 6A and 6B, the present embodiment suggests a structure where the efflux portion of the rear reaction tank 8 is divided into upper and lower parts. That is, an additional upper rectifying wall 15 is further formed in the middle of the porous rectifying wall 4 extending toward the inner side of the rear reaction tank 8. The porous rectifying wall 4 partitions the rear reaction tank 8 and the discharging tank 5. Then, the dead space of the fore and rear reaction tanks 7 and 8 is minimized by flowing the water from the upper influx portion of the rear reaction tank 8 to the upper efflux portion and flowing the water from the lower influx portion of the rear reaction tank 8 to the lower efflux portion.

Meanwhile, although the embodiments of the present invention shows porous filtering media 9 filled in the fore reaction tank 7, the technology of the present invention is not limited to the embodiments only, but it can use aluminum sulfate, iron salt, lime and polymer coagulant instead of the porous filtering media 9, or it may include a unit for injecting highly pure oxygen or ozone to maximize the sewage removal efficiency.

Hereinafter, the sewage tertiary treatment method is described, taking the sewage treatment apparatus of FIG. 3 as an example. In the present invention, what should be removed from the sewage are suspended solids, organic matters and nutritive salts such as nitrogen and phosphorous. The method is based on the principle of natural falling while flowing without requiring any external power source.

In other words, the effluent wastewater of the sewage disposal plant flows into the inflow tank 1 and is retained in the fore reaction tank 7. Then, it passes through the porous filtering media 9 and 10 having predetermined sizes of surface area and openings filled in the fore reaction tank 7 to precipitate and resolve the suspended solids and organic matters remaining in the sewage based on physical and biological reactions. Along with the removal of the suspended solids, a small amount of organic matters and nutritive salts included in the suspended solids are removed as well. The sewage processing efficiency can be maximized by adding a coagulant, together with the porous filtering media, or injecting highly pure oxygen or ozone to the fore reaction tank 7.

The suspended solids, organic matters, nitrogen and phosphorous are removed in the fore and rear reaction tanks 7 and 8 based on the following principles and methods.

First, the suspended solids are removed by using the following principle and method. The particles remaining in the effluent wastewater of the settling basin after passing through a biological process are living or dead microorganisms, pin-floc and unprocessed colloid. These materials cause turbidity. The suspended solids are removed by being precipitated on the surface of the porous filtering media 9 and 10 having large surface areas. The particles that have passed through the porous filtering media 9 and 10 cause local turbulences, and as a result, the collisions between the particles are increased. The collision and attachment reactions are performed repeatedly on the surface of the filtering media to thereby increase the size and density of the particles, and the thickening and compression are repeated on the surface of the filtering media. The minute particles still remaining after passing through the porous filtering media pass through a filtering media layer and the thickened sludge subsequently, and then they are removed by being strained out and intercepted.

Now, the principle and method of removing organic matters in the fore and rear reaction tanks 7 and 8 will be described.

The effluent wastewater of the settling basin includes suspended solids of living or dead microorganisms, and dissolved organic matters which are not removed yet. Here, the organic matters are removed in two ways. First, the organic matters included in the suspended solids are removed by getting rid of the suspended solids in the reaction tanks. The dissolved organic matters, which are not processed yet, are removed by aerobic or anaerobic biodegradation performances of the microorganisms attached to the surface of the filtering media. The amount of the sludge precipitated in the reaction tanks is reduced by biodegradation. In case where a biological membrane method is used, the sludge age of the precipitated sludge, i.e., solids retention time (SRT), becomes much longer than the suspended growth time. So, the sludge in the reaction tanks is digested by itself and thus the amount of sludge is reduced remarkably.

In accordance with the present invention, nitrogen is removed in the fore and rear reaction tanks 7 and 8 based on the following principle and method.

In the effluent wastewater of the settling basin, nitrogen exits mainly in the forms of $NH_4^+$—N, $NO_3^-$—N and organic-N. Among them, $NH_4^+$—N is used for synthesizing cells through microorganism metabolism, and at the same time, it is converted into $NO_3^-$N through a nitrification process. The nitrogen of $NO_3^-$N can be removed, as $NO_3^-$N is denitrificated by a microorganism under anaerobic condition and then converted into $N_2$ gas. Physical methods such as filtering and adsorption are effective in removing organic nitrogen existing in the form of particles, but it cannot remove materials with high dissolution, e.g., ammonia or nitrate.

In the present invention, the nitrification reaction occurs additionally by the high-density biological membrane formed in the fore reaction tank 7, and as it goes to the rear part, anaerobic condition is made, and thus denitrification reaction is expected to occur due to the denitrifying microorganism which uses the remaining organic matters.

The nitrogen and phosphorous included in the suspended solids are removed as the sludge precipitated in the fore and rear reaction tanks 7 and 8 periodically.

In addition, the present invention induces the oxidation and nitrification of the organic matters by supplying highly pure oxygen, which will become dissolved oxygen later, in the fore reaction tank 7, and induces denitrification reaction in the rear reaction tank 8 to convert them into $N_2$ gas.

If ozone ($O_3$) is supplied, the biodegradation of the organic matters which are hard to be decomposed is promoted. Thus, the organic matter and the coagulated pin-floc can be removed efficiently. Also, nitrification is induced and denitrification in the rear reaction tank is promoted additionally.

Phosphorous in the fore and rear reaction tanks 7 and 8 is removed based on the following principle and method. Phosphorous in the effluent wastewater of the settling basin exists in the form of dissolved $PO_4^{-3}$—P and in the state of solid included in the cells of microorganism. The part of the dissolved phosphorous is removed by the synthesis of microorganism cells. That is, the biological removal of phosphorous is performed based on the metabolism of microorganism under aerobic/anaerobic condition. The phosphorous can be removed by getting rid of extra sludge, when phosphorous is overly taken into cells under an aerobic condition. The solid state of phosphorous is removed precipitated by the filtering media. Phosphorous can be removed effectively using a coagulation and precipitation method. As for the coagulant, aluminum sulfate, iron salt, lime and polymer coagulant may be used. Phosphate is precipitated in the forms of $AlPO_4$, $FePO_4$, $Ca_5(OH)(PO_4)_3$ by the metallic ions of the coagulant. Organic phosphorous in the form of organic particles can be precipitated here, too.

As described above, when the coagulant is put into the inflow tank 1 in accordance with the present invention, the suspended solids can be removed effectively and the dissolved phosphorous can be coagulated efficiently and then precipitated.

In addition, the technology of the present invention can clean and remove the sludge attached on the porous filtering media in the fore and rear reaction tanks 7 and 8 periodically.

The technology of the present invention can maximize the precipitation of the suspended solids included in the discharged water due large opening and high opening rate, compared to other conventional methods such as sand filtering. So, it is possible to perform a tertiary treatment of sewage efficiently and use the cleaned water for a wastewater reclamation and reusing system. Moreover, compared to common filtering methods, the technology of the present invention has the less clogged openings, and consumes less amount of power due to the remarkably long back-washing period. Due to the small specific gravity of the waste plastics or plastics used as porous filtering media, it is easy to maintain the sewage treatment facility and it has an effect of resource recycling.

While the present invention has been described with respect to certain preferred embodiments, it will be apparent to those skilled in the art that various changes and modifications may be made without departing from the scope of the invention as defined in the following claims.

What is claimed is:

1. An apparatus for performing a tertiary treatment of sewage using porous filtering media, comprising:

a reaction tank into which effluent wastewater of a settling basin flows;

porous filtering media in the shape of a ring with both ends going amiss having predetermined sizes of surface areas and openings and filled in the reaction tank, for removing suspended solids by precipitating suspended solid particles included in the effluent wastewater and removing organic matters and nutritive salts included in the suspended solid particles along with the precipitation removal of the suspended solid particles; and a two-step overflow weir installed in the upper surface of the efflux portion of the reaction tank, for discharging the water uniformly cleaned in the reaction tank, wherein the two-step overflow weir receives an upper flow of the effluent wastewater flowing in through one side of the two-step overflow weir and receiving a lower flow of the effluent wastewater flowing in through the bottom and the other side.

2. The apparatus as recited in claim 1, wherein the porous filtering media are formed of waste plastics or plastics having a size of 10~300 mm.

3. The apparatus as recited in claim 1, wherein the small size of the porous filtering media are filled in the upper part of the reaction tank, and the size of the porous filtering media becomes larger as it goes to the lower part of the reaction tank.

4. The apparatus as recited in claim 1, wherein the opening rate of the porous filtering media filled in the reaction tank is 50~90%.

5. The apparatus as recited in claim 1, wherein the reaction tank includes:
a fore reaction tank, which is filled with the porous filtering media, for collecting the effluent wastewater from the settling basin and performing precipitation based on biological, physical and chemical reactions;
a rear reaction tank filled with a predetermined size of porous filtering media, for re-treating the effluent water from the fore reaction tank;
a discharging tank provided with a two-step overflow weir on one side of the upper part of the efflux portion, for retaining and discharging the secondary effluent water from the rear reaction tank; and
rectifying walls having a plurality of efflux openings for partitioning the fore reaction tank, rear reaction tank and discharging tank.

6. The apparatus as recited in claim 5, wherein the filtering media filled in the fore reaction tank are formed of a predetermined size of porous filtering media.

7. The apparatus as recited in claim 5, wherein the filtering media filled in the fore reaction tank are formed of any one selected from a group consisting of aluminum sulfate, iron salt, lime and polymer coagulant.

8. The apparatus as recited in claim 5, further including:
a highly pure oxygen injection means, installed in the lower part of the fore reaction tank, for inducing phosphorous removal and denitrification.

9. The apparatus as recited in claim 5, further including:
an ozone injection means, installed in the lower part of the fore reaction tank, for inducing phosphorous removal and denitrification.

10. The apparatus as recited in claim 5, wherein the diameter of the porous filtering media in the fore reaction tank is 50~300 mm.

11. The apparatus as recited in claim 5, wherein the diameter of the porous filtering media in the rear reaction tank is 10~200 mm.

12. The apparatus as recited in claim 5, wherein the opening rate of the porous filtering media filled in the fore and rear reaction tanks is 50~90%.

13. The apparatus as recited in claim 6, wherein the porous filtering media are formed of plastics including waste plastics.

14. The apparatus as recited in claim 5, wherein the size of the porous filtering media in the fore part of the rear reaction tank is large, and the size of the porous filtering media becomes smaller as the porous filtering media goes to the rear part.

15. The apparatus as recited in claim 5, further including:
sludge retention tanks installed in the lower parts of the fore and rear reaction tanks, respectively, for collecting and removing the sludge produced during the sewage treatment process.

16. The apparatus as recited in claim 5, further including:
an air supplier installed in the lower part of the rear reaction tank, for removing the sludge produced during the sewage treatment process.

17. The apparatus as recited in claim 5, further including:
a supersonic generator installed in the lower part of the rear reaction tank, for removing the sludge produced during the sewage treatment process.

18. The apparatus as recited in claim 5, wherein the area of the influx portion of the fore reaction tank is formed larger than the area of the efflux portion of the rear reaction tank to make the speed of a current uniformly distributed in the fore and rear reaction tanks.

19. The apparatus as recited in claim 5, further including:
an upper rectifying wall, which has a plurality of efflux openings and is extended to the inner side of the rear reaction tank from a predetermined area of the rectifying wall that partitions the rear reaction tank and the discharging retention tank, for minimizing the dead space area of the rear reaction tank.

20. A method for performing a tertiary treatment of sewage using porous filtering media, comprising the steps of:
a) collecting the effluent wastewater from a settling basin, flowing the effluent wastewater through porous filtering media having predetermined sizes of surface areas and openings and filled in a fore reaction tank, and processing suspended solids and organic matters based on biological, physical and chemical reactions;
b) taking in the rear reaction tank the effluent water cleaned in the fore reaction tank, flowing the cleaned water through the porous filtering media having predetermined sizes of surface areas and openings and filled in the rear reaction tank, and removing suspended solids and organic matters based on biological, physical and chemical reactions; and
c) retaining the water discharged from the rear reaction tank in the discharging tank and discharging the water through a two-step overflow weir.

21. The method as recited in claim 20, further comprising a step of:
d) removing nitrogen and phosphorous included in the suspended solids by getting rid of the sludge precipitated in the fore and rear reaction tanks periodically.

22. The method as recited in claim 20, further comprising a step of:
e) inducing the oxidation and nitrification of the organic matters by supplying dissolved oxygen to the fore reaction tank, and then promoting denitrification reaction in the rear reaction tank.

23. The method as recited in claim 20, further comprising a step of:
f) removing the organic matters by supplying ozone ($O_3$) to the fore reaction tank to promote the biodegradation of the organic matters which are not decomposed easily, increasing the efficiency of removing coagulated particles and inducing nitrification, and promoting denitrification in the rear reaction tank.

24. The method as recited in claim 20, further comprising a step of:
g) coagulating and precipitating the dissolved phosphorous by adding a coagulant to the fore reaction tank to increase the effect of removing the suspended solids.

25. The method as recited in claim 20, further comprising a step of:
h) cleaning and removing the sludge attached on the porous filtering media periodically by providing air or supersonic from the lower part to the upper part of the fore and rear reaction tanks.

26. The method as recited in claim 1, wherein the porous filtering media are in form of a coil spring shape including a ring with both ends going amiss consecutively.

27. The apparatus as recited in claim 1, wherein the porous filtering media are attached in the reaction tank.

* * * * *